(12) United States Patent
Simmons et al.

(10) Patent No.: US 12,233,732 B2
(45) Date of Patent: Feb. 25, 2025

(54) CUSTOMIZED ELECTRIC VEHICLE CHARGER

(71) Applicant: EATON INTELLIGENT POWER LIMITED, Dublin (IE)

(72) Inventors: Mitchel A. Simmons, Raleigh, NC (US); Saivaraprasad Murahari, Peachtree City, NC (US); Advait Madhusudan Katarki, Atlanta, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 535 days.

(21) Appl. No.: 17/695,439

(22) Filed: Mar. 15, 2022

(65) Prior Publication Data

US 2023/0294536 A1    Sep. 21, 2023

(51) Int. Cl.
| | |
|---|---|
| *B60L 53/31* | (2019.01) |
| *B60L 53/14* | (2019.01) |
| *B60L 53/30* | (2019.01) |
| *B60L 53/62* | (2019.01) |
| *B60L 53/66* | (2019.01) |

(52) U.S. Cl.
CPC ............... *B60L 53/31* (2019.02); *B60L 53/14* (2019.02); *B60L 53/305* (2019.02); *B60L 53/62* (2019.02); *B60L 53/66* (2019.02)

(58) Field of Classification Search
CPC ........ B60L 53/31; B60L 53/14; B60L 53/305; B60L 53/62; B60L 53/66; B60L 3/04; Y02T 10/70; Y02T 10/7072

USPC .......................................................... 320/109
See application file for complete search history.

(56) References Cited

U.S. PATENT DOCUMENTS

| | | | |
|---|---|---|---|
| 8,447,543 B2 * | 5/2013 | Dickinson ............... | B60L 53/62 |
| | | | 702/58 |
| 9,073,439 B2 * | 7/2015 | Brown .................... | B60L 53/00 |
| 9,178,375 B2 * | 11/2015 | Kilb ....................... | H02H 3/085 |
| 9,368,959 B2 * | 6/2016 | Wright, Jr. ............... | B67D 7/08 |
| 9,428,064 B2 * | 8/2016 | Ono ........................ | B60L 55/00 |
| 9,434,268 B2 * | 9/2016 | DeBoer ................... | B60L 53/60 |
| 9,566,868 B2 * | 2/2017 | Jammer ................. | B60L 53/665 |
| 11,173,796 B2 * | 11/2021 | Zhong ................... | B60L 53/665 |
| 11,316,348 B2 * | 4/2022 | Karlgaard .......... | H02J 13/00034 |

(Continued)

*Primary Examiner* — M Baye Diao
(74) *Attorney, Agent, or Firm* — Eckert Seamans Cherin & Mellott, LLC

(57) ABSTRACT

An electric vehicle (EV) charger includes a disconnect switch assembly including an EV connector structured to be inserted into a power receptacle for an EV, an EV charging cord coupled to the EV connector, and a disconnect switch box including a disconnect switch structured to connect or disconnect power supply to the EV and a terminal block structured to connect communications lines, where the disconnect switch box is structured to be installed at a charging space for the EV; and an EV circuit breaker charger couplable to the disconnect switch box via a separate EV charging cord and structured to be inserted within a panelboard remotely located from the charging space, the EV circuit breaker charger including a circuit interrupter structured to interrupt current from flowing to the EV in an event of fault, an EV charger structured to supply power to the EV, and a communications component structured to communicate with the EV via the communications lines.

20 Claims, 4 Drawing Sheets

(56) References Cited

U.S. PATENT DOCUMENTS

| | | | | |
|---|---|---|---|---|
| 11,318,858 B2* | 5/2022 | Zheng | ............... | B60L 53/30 |
| 11,724,614 B2* | 8/2023 | Legare | ............... | B60L 53/16 |
| | | | | 320/109 |
| 2014/0015482 A1* | 1/2014 | Nitzberg | ............... | B60L 53/305 |
| | | | | 320/109 |
| 2014/0214224 A1* | 7/2014 | Watkins | ............... | B60L 53/68 |
| | | | | 700/297 |
| 2023/0137396 A1* | 5/2023 | Mu | ............... | B60L 53/18 |
| | | | | 320/104 |

* cited by examiner

CUSTOMIZED ELECTRIC VEHICLE CHARGER

FIELD OF THE INVENTION

The disclosed concept relates generally to an electric vehicle (EV) charger, and in particular, to an EV charger including an EV circuit breaker charger and a disconnect switch assembly with a preinstalled EV charging cord and EV connector.

BACKGROUND OF THE INVENTION

As the world transitions to sustainable and renewable energy, the demand for electric vehicles as well as electric vehicle supply equipment (EVSE) has recently increased significantly. In light of such demand and transition, numerous standards and local ordinances have been established to set forth safety and security protocols as well as relevant building codes pertaining to the installation of the EVSE or EV charging stations. For example, Article 625 of National Electric Code (NEC) provides standards for EV charging system. Section 625.43 of the NEC, in particular, requires a disconnecting means to be provided and installed in a readily accessible location for equipment rated more than 60 amperes or more than 150 volts. Consistent with the NEC requirements, typical EV charging systems include EV wall chargers with local disconnecting means installed on walls or pedestals in EV charging locations. However, such wall chargers installed openly and readily accessible at every charging location can be expensive and prone to vandalism. Further, a physical EV charger may need to be located away from an EV charging cord and a connector set. For example, an EV smart breaker charger may be placed within a panelboard in a utility room or laundry room located remotely from the charging location, and thus, its breaker mechanism will not be readily accessible where the EV charging occurs.

There is room for improvement in EV charging.

SUMMARY OF THE INVENTION

These needs, and others, are met by an electric vehicle (EV) charger including a disconnect switch assembly including an EV connector structured to be inserted into a power receptacle for an EV, an EV charging cord coupled to the EV connector, and a disconnect switch box including a disconnect switch structured to connect or disconnect power supply to the EV and a terminal block structured to connect communications lines, where the disconnect switch box is structured to be installed at a charging space for the EV; and an EV circuit breaker charger couplable to the disconnect switch box via a separate EV charging cord and structured to be inserted within a panelboard remotely located from the charging space, the EV circuit breaker charger including a circuit interrupter structured to interrupt current from flowing to the EV in an event of fault, an EV charger structured to supply power to the EV, and a communications component structured to communicate with the EV via the communications lines.

Another example embodiment includes a disconnect switch assembly for use in charging an electric vehicle (EV). The disconnect switch assembly includes an EV connector structured to be inserted into a power receptacle for an EV, an EV charging cord coupled to the EV connector, and a disconnect switch box structured to be installed at a charging space for the EV and including a disconnect switch structured to connect or disconnect power supply to the EV and a terminal block structured to connect communications lines, wherein the disconnect switch box is couplable to an EV circuit breaker charger via a separate EV charging cord and the EV circuit breaker charger is structured to be inserted within a panelboard remotely located from the charging space, provide a circuit protection in an event of fault, supply power for EV charging to the EV via power lines, and communicate with the EV via the communications lines.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
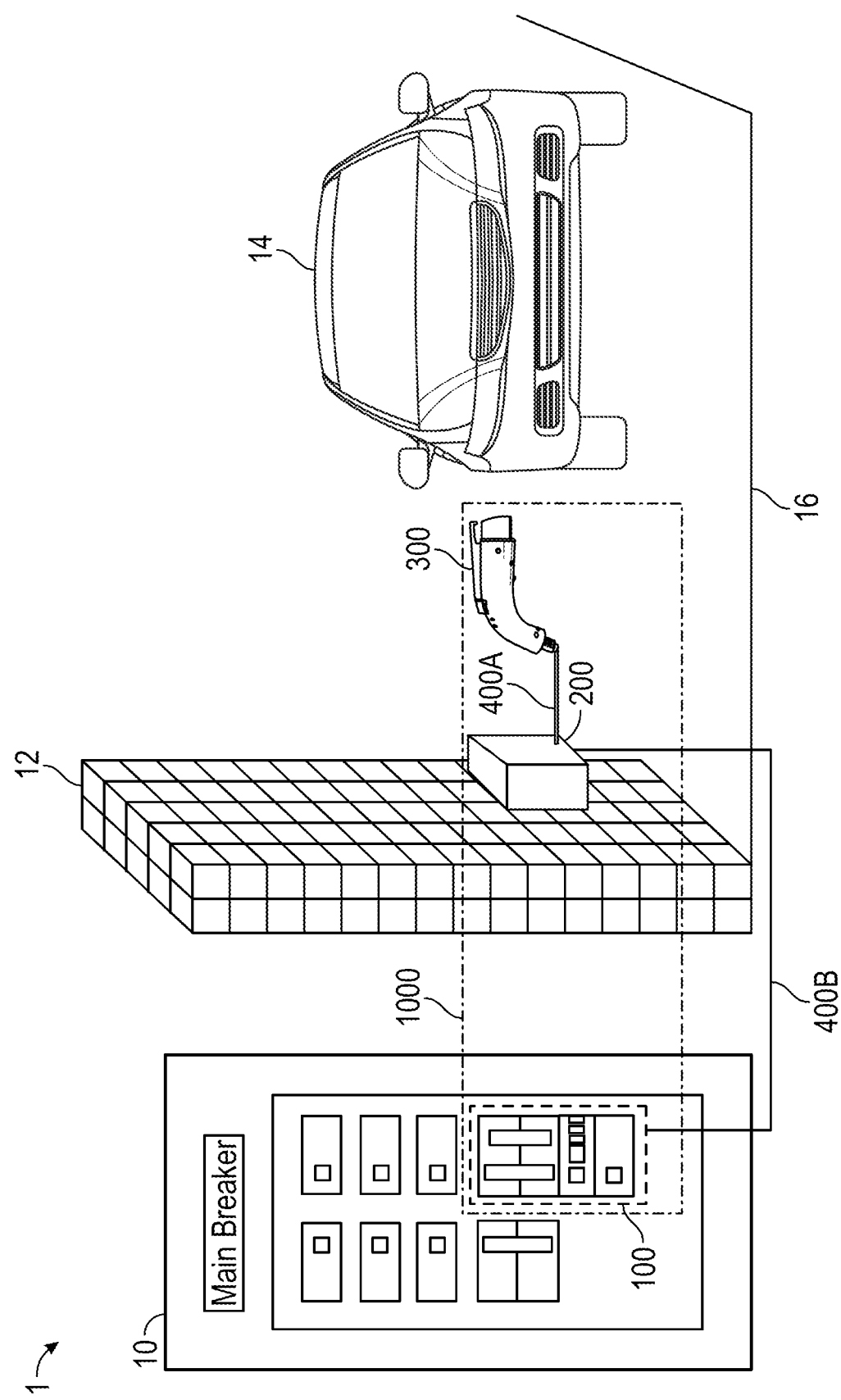
FIG. 1 is a diagram of an EV charging system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Article 625 of National Electric Code (NEC) provides standards for EV charging system. Section 625.43 of the NEC, in particular, requires a lockable open disconnecting means to be provided and installed in a readily accessible location for equipment rated more than 60 amperes or more than 150 volts. Typically, EV charging systems include EV wall chargers with local disconnecting means installed on walls or pedestals. Such wall chargers are cost-ineffective and prone to vandalism. Further, a physical EV charger may need to be located away from an EV charging cord and connector set. For example, an EV smart breaker charger may be located in a panelboard in a utility room or laundry room, and thus, its breaker mechanism will not be readily accessible where the EV charging occurs. In those instances, a separate, local and readily accessible disconnecting means is required to be installed in the charging location. In addition, the overall usable length of the charging cord coupled to the disconnecting means and the EV connector should not be more than 7.62 meters (25 feet) under the NEC.

The example embodiments of the disclosed concepts resolve these problems by providing an EV charger including a disconnect switch assembly and an EV circuit breaker charger. The disconnect switch assembly includes an EV charging cord, an EV connector and a disconnect switch. The disconnect switch assembly is preassembled at the manufacturer and shipped as a single component along with the EV circuit breaker charger. Upon delivery, the disconnect switch may be installed at a wall or pedestal of an EV charging location or space for an EV. The EV circuit breaker charger is capable of being disposed within a typical panelboard and is couplable to the disconnect switch via a charging cable, which may be the same as the EV charging cord but with a different length in accordance with the distance between the panelboard and the disconnect switch. By combining the local disconnect switch with the remotely installed EV circuit breaker charger, the EV charger provides a cost-effective solution to, e.g., the NEC's local disconnecting means requirement. Further, the disconnect switch provides a safety mechanism for a user to manually disconnect the disconnect switch from the power supply received from the EV circuit breaker charger in the event of faults or upon occurrence of damage to the EV charging cord or the EV connector. In addition, such combining of the local disconnect switch with the remote EV circuit breaker charger also minimizes exposure to vandalism. For example, the combination protects the more expensive EV circuit breaker charger by allowing the EV circuit breaker charger to be installed remotely in a protected environment (e.g., a locked panelboard, switchboard, a separately locked electrical equipment room, etc.). Additionally, the EV charger provides an alert component (e.g., a buzzer) as a means to obtain proper attention from, e.g., without limitation, a facility manager, a parking lot attendant, etc., in the event of a fault. Upon being alerted, the facility manager is allowed to clear the fault as soon as the fault is detected. By allowing immediate clearance of the fault, such alert component reduces suspension time for EV charging and resultant customer dissatisfaction. Moreover, the EV charger provides a flexibility to scale up for commercial and industrial customers requiring higher EV charger points. That is, such customers may easily add an additional EV smart breaker charger and another EV charging space as soon as a panelboard is installed. Furthermore, the EV charger may include a status indicator (e.g., without limitation, an LCD screen or LEDs) for charging status of the EV smart breaker charger (e.g., without limitation, charging, idle, or faults). The LCD screen may be located on the front cover of the disconnect switch and act as an easy-to-use interface for the user and indicate the charger status by e.g., flashing a virtual button or an LED. In short, the EV charger in accordance with the present disclosure provides an easy-to-install, cost-effective, scalable EV charging system with increased charging efficiencies and protections in compliance with the relevant standards, FIG. 1 is an EV charging system 1 in accordance with an example embodiment of the disclosed concept. The EV charging system 1 includes a panelboard 10, an EV 14 to be charged and an EV charger 1000 structured to connect the panelboard 10 and the EV 14. The panelboard 10 is a standard panelboard, which may be installed in, e.g., without limitation, a utility room or an electric room for a commercial or industrial facilities, or a laundry room or basement for a single-family residences. The EV charger 1000 is customized and preassembled according to the customer's needs at the manufacturer and includes an EV circuit breaker charger 100, a disconnect switch box 200, an EV connector 300, and EV charging cord 400A. The EV circuit breaker charger 100 may be a standard EV smart circuit breaker charger with charging capability and remote-access-control by a user via, e.g., without limitation, RF communications protocols such as Zigbee, Z-Wave, and so forth. The EV smart circuit breaker charger 100 may be connected to a disconnect switch box 200 via an EV charging cord 400B. The EV charging cord 400B may transit via a conduit (e.g., passing through or around the wall 12, floor, or pedestal). The EV charging cord 400B may be obtained separately for installation upon measuring the distance between the panelboard 10 and the disconnect switch box 200 by a facility engineer. The disconnect switch box 200 is also coupled to the EV charging cord 400A and the EV connector 300 for EV charging. The disconnect switch box 200 includes a standard disconnect or safety switch structured to connect or disconnect the EV smart circuit breaker charger 100 as necessary (e.g., without limitation, upon detection of a fault or damage to the EV charging cord 400A or the EV connector 300). The disconnect switch box 200 may be mounted on the wall 12 associated with an EV charging space (e.g., EV charging station, a parking space, etc.) 16 for the EV 14. While FIG. 1 illustrates the disconnect switch box 200 being mounted on the wall 12, it is understood that the disconnect switch box 200 may be mounted or installed on a pedestal or a stand, depending on the location (e.g., without limitation, indoor, outdoor, etc.) of the charging space 16. The EV connector 300 is a standard EV connector structured to be inserted into a power receptacle for the EV 14. The EV charging cords 400A, 400B is a standard multi-wire conductors for EV charging. The panelboard 10 may include a plurality of EV smart circuit breaker chargers each coupled to one disconnect switch box 200 such that it is easy for the customer to scale up the EV charging capacity (e.g., from one EV charger for one charging space to ten EV chargers for ten charging spaces) in accordance with a number of available EV charging spaces.

Figure 2:
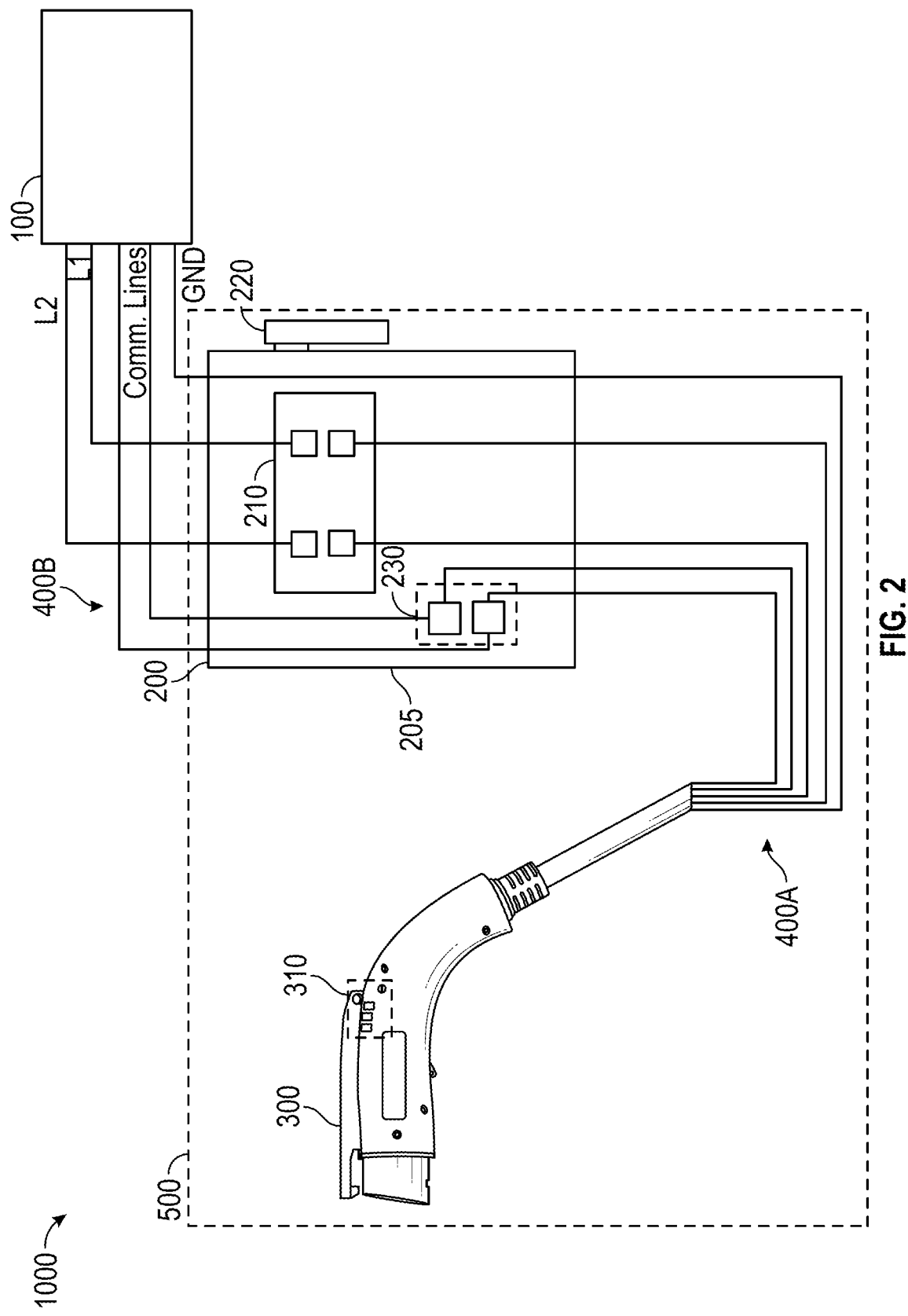
FIG. 2 is a diagram of an EV charger in accordance with an example embodiment of the disclosed concept.
Figure 4C:
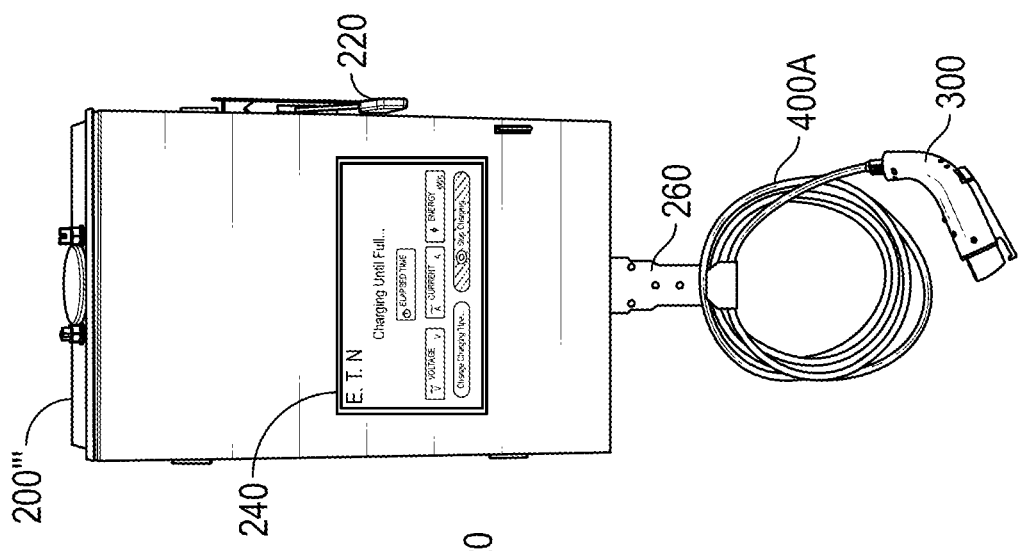
FIGS. 4A-C illustrate example disconnecting means in accordance with example embodiments of the disclosed concept.
Figure 4B:
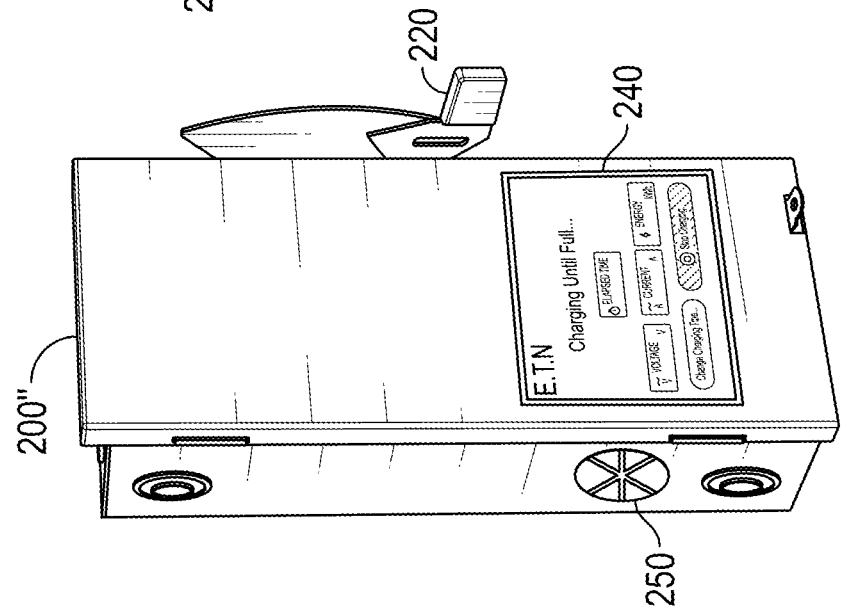
Figure 4A:
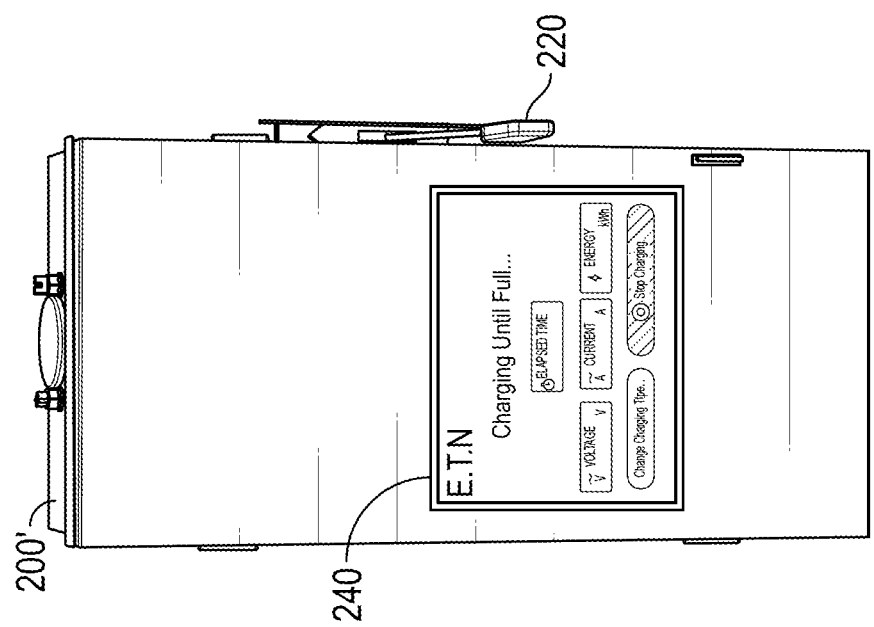

For operation, the user inserts the EV connector 300 into an EV charging receptacle of the EV 14 for charging in the charging space 10. When the EV connector 300 is inserted into the EV 14, there is a handshake between the EV 14 and the EV smart circuit breaker charger 100. During the handshake, the EV 14 and the EV smart circuit breaker charger 100 communicate with each other, e.g., without limitation, whether the EV smart circuit breaker charger 100 is a right charger for the EV 14, what is right charge current for the EV 14, etc. Upon a successful handshake, the current flows in L1 and L2 from the EV smart circuit breaker charger 100 to the EV 14. The EV 14 stops charging when the EV 14 is fully charged or upon detection of, e.g., without limitation, faults or component damages. The EV smart circuit breaker charger 100 has a current sensor for detecting, e.g., without limitation, whether the EV 14 is charging, has stopped charging, or a fault has occurred. When the EV 14 is fully charged, an indicator may indicate that the charging is complete. The indicator may be an LCD touch screen on the front cover of the disconnect switch box 200 (as shown in FIGS. 4A-C). Alternatively, it may be a set of LEDs (as shown in FIG. 2) on the EV connector 300, flashing the charging status of the EV smart circuit breaker charger 100. If there is a fault, the indicator will indicate that there is fault. If the charging has stopped, e.g., upon completion of charging the EV 14, the indicator will indicate that the EV smart circuit breaker charger 100 is idle.

FIG. 2 illustrates an example EV charger 1000 in accordance with an example embodiment of the disclosed concept. The EV charger 1000 includes an EV smart circuit breaker charger 100 and a disconnect switch assembly 500. The EV smart circuit breaker charger 100 is placeable within a compatible panelboard or switchboard, and is structured to provide circuit protection (e.g., interrupting current from flowing by tripping the circuit breaker 100 in an event of fault), supply power for EV charging to the EV 14 via power lines, communicate with the EV 14 via communication lines, and provide remote control access to a user for controlling the EV smart circuit breaker charger 100. The disconnect switch assembly 500 includes a disconnect switch box 200, an EV connector 300, and an EV charging cord 400A coupled to the disconnect switch box 200 and the EV connector 300. The disconnect switch box 200 includes a frame 205, a disconnect switch 210, an external handle 220 for opening or closing the disconnect switch 210, and terminal blocks 230. The disconnect switch 210 may be a standard disconnect switch with a 60A, 2-pole, single throw design, but it will be understood that this is for illustrative purposes only and the disconnect switch 100 may have different designs depending on the customer needs and/or circumstances. The disconnect switch 210 is coupled to the EV charging cord 400A and couplable to the EV smart circuit breaker charger 100. The disconnect switch 210 is structured to connect or disconnect power received from the EV smart circuit breaker charger 100 via the power lines (L1, L2). The disconnect switch 210 utilizes standard operating mechanism and ground lug (not shown). The terminal blocks 230 may be disposed on a front cover of the frame 205 of the disconnect switch box 200 and are structured to connect communication lines (e.g., without limitations, CP (control pilot), +12V, etc.) between the EV smart circuit breaker charger 100 and the EV connector 300. As such, the disconnect switch box 200 not only provides line, neutral and control signals, but also terminates the communication lines within the disconnect switch box 200. Upon connecting the EV 14 with the EV smart circuit breaker charger 100 via the disconnect switch assembly 500, the EV 14 and the EV smart circuit breaker charger 100 make necessary communications with each other for EV charging. The communications include, e.g., without limitation, whether the EV smart circuit breaker charger 100 is a right charger for the EV 14, what is the right charge current for the EV 14, etc.

The EV connector 300 is a standard EV connector structured to be inserted into a power receptacle for the EV 14. In some examples, the EV connector 300 may include an indicator 310 for charging status of the EV smart circuit breaker charger 100. The charging status includes an indication for the EV smart circuit breaker charger 100 being, e.g., without limitation, charging, idle, or in a fault. The indicator 310 may be a set of light emitting diodes (LEDs) which may flash to indicate whether the EV smart circuit breaker charger 100 is charging, idle, or in fault. For example, the LEDs may include a green LED lit for indicating that the EV smart circuit breaker charger 100 is charging, an orange LED lit for indicating that the EV smart circuit breaker charger 100 is idle, and a red LED lit when a fault or damage to charging components (e.g., without limitation, the EV connector 300, the EV charging cable 400, etc.) is detected. The indicator 310 may not be included if the disconnect switch box 200 already includes an indicator as shown in FIGS. 4A-C.

The EV charging cables 400A, B are multi-wire conductors, including the power lines (L1, L2), communications lines (CP line and +12V line) and ground. While the EV charging cables 400A is less than or equal to 7.62 meter (25 feet) in length in compliance with the NEC, the length of EV charging cables 400B depends on the distance between the panelboard 10 and the disconnect switch box 200. The EV charging cables 400A are pre-assembled and/or customized with the EV connector 300 and the disconnect switch box 200 at the manufacturer, allowing the user to simply mount the disconnect switch box 200 on the wall 12 or pedestal for use upon delivery. The customization includes the terminal blocks 230 installed to connect the CP signal wire and +12V signal wire between the EV smart circuit breaker charger 100 and the EV connector 300. As such, the EV charger 1000 is a complete assembly in which the EV charging cord 400A is factory installed or terminated within the disconnect switch box 200. Whereas, the facility engineer measures the required length of the EV cable 400B and may obtain the EV cable 400B separately from the customized EV charger 1000. In some examples, the EV charger 1000 may be used for higher rated equipment having higher power applications (e.g., cybertrucks, electric planes, electric boats, etc.).

Figure 3:
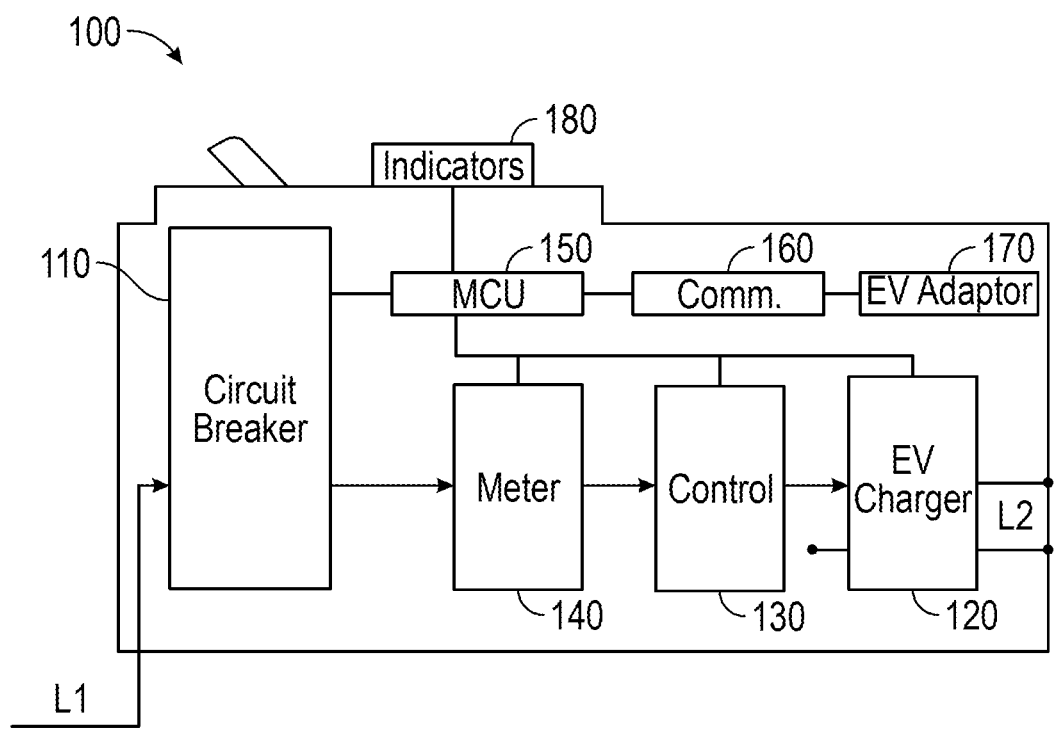
FIG. 3 is a block diagram of an example EV smart breaker charger.

FIG. 3 is a block diagram of an EV smart circuit breaker charger 100 in accordance with an example embodiment of the disclosed concept. The EV smart circuit breaker charger 100 is structured to provide circuit protection (e.g., interrupting current from flowing by tripping the circuit breaker 100 in an event of fault), supply power for EV charging to the EV 14 via power lines, communicate with the EV 14 via communication lines, and provide remote control access to a user for controlling the EV smart circuit breaker charger 100 via, e.g., without limitation, RF communications protocols such as Zigbee, Z-Wave, and so forth. The EV smart circuit breaker charger 100 includes a circuit breaker 110, an EV charger 120, a control 130, a meter 140, a microcontroller 150 for controlling DC components, communications component 160, an EV adaptor 170, and indicators 180. The circuit breaker 110 may be a UL 489 compliant thermal-magnetic device and provides short circuit, overload protection for the circuit. The EV charger 120 is structured to provide charging current to the EV 14 when connected, and is coupled to a ground fault protection (e.g., 20 mA ground fault circuit interrupter, not shown), communications component 160 for SAE J-1772™ for annunciating available line current and charger/vehicle connectivity with an EV 14, and an EV adaptor 170. The communications component 160 may also allow the user to remotely access the EV smart circuit breaker charger 100 via wireless connection (e.g., without limitation, RF communications protocols such as Zigbee, Z-Wave, and so forth.). The indicators 180 may be an LCD or LEDs arranged, e.g., without limitation, on a frame of the EV smart circuit breaker charger 100 and indicate the status of the EV smart circuit breaker charger 100 (e.g., without limitation, charging, idle, fault, tripped, etc.). In FIG. 3, the EV smart circuit breaker charger 100 is a 240 V charger including L1 and L2. The EV smart circuit breaker charger 100 is shipped as a part of the EV charger 1000. Upon delivery, the customer may simply place the EV smart circuit breaker charger 100 within a panelboard, a switch board, etc. for EV charging. The EV charger 1000 may not include the EV charging cord 400B, and thus, the facility engineer may measure the length required and install the EV charging cable 400B on site while installing the EV charger 1000 in the charging space 16.

FIGS. 4A-C illustrate example disconnect switch boxes 200', 200", 200''' in accordance with example embodiments of the disclosed concept. FIG. 4A depicts a disconnect switch box 200' including a user interface 240 structured to be used by the user for interfacing with the EV smart circuit breaker charger 100. The user interface 240 may be an LCD touch screen, including virtual buttons for e.g., without limitation, changing charge type, stopping charging, etc. The LCD screen 240 also displays charging status (e.g., without limitation, charging, idle, faults, etc.) and/or charging information (elapsed time, voltage, current and energy for charging). Such indication of charging status allows an EV driver looking for an available EV charging station to easily recognize an idle EV charging station as he/she is driving. FIG. 4B illustrates a disconnect switch box 200" including the user interface 240 and an alert mechanism 250. The alert mechanism 250 may include a buzzer and/or a flashing LED for alerting fault, thereby providing a means to alert a facility manager or a parking lot attendant to clear the fault immediately upon detection of the fault. Without this alert mechanism, the fault may remain uncleared while the EV charging is being suspended, resulting in waste of time and customer dissatisfaction. FIG. 4C shows a disconnect switch box 200''' including the user interface 240 and a holder 260 for the EV charging cable 400A and the EV connector 300. The holder 260 is coupled to the frame 205 of the disconnect switch box 200''' and allows the customer to organize the EV charging cable 400A and the EV connector 300 in a manner to protect them from any damages that may occur as a result of leaving them spread out on the floor of the charging space 16. In some examples, there may be a locking mechanism (e.g., padlock) to lock the EV charging cable 400A and the EV connector 300 so as to reduce vandalism.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An electric vehicle (EV) charger, comprising:
   a disconnect switch assembly including:
      an EV connector structured to be inserted into a power receptacle for an EV;
      an EV charging cord coupled to the EV connector; and
      a disconnect switch box including a disconnect switch structured to connect or disconnect power supply to the EV and a terminal block structured to connect communications lines, wherein the disconnect switch box is structured to be installed at a charging space for the EV; and
   an EV circuit breaker charger couplable to the disconnect switch box via a separate EV charging cord and structured to be inserted within a panelboard remotely located from the charging space, the EV circuit breaker charger comprising a circuit interrupter structured to interrupt current from flowing to the EV in an event of fault, an EV charger structured to supply power to the EV, and a communications component structured to communicate with the EV via the communications lines.

2. The EV charger of claim 1, wherein the separate EV charging cord passes through at least one of a wall, a floor, or a pedestal to couple the EV circuit breaker charger to the disconnect switch.

3. The EV charger of claim 2, wherein the disconnect switch box is installed on the wall or the pedestal adjacent to the charging space.

4. The EV charger of claim 1, wherein the disconnect switch comprises a two-pole single throw switch.

5. The EV charger of claim 1, wherein the terminal block connects the communication lines between the EV circuit breaker charger and the EV connector, the communications lines comprising at least a control pilot signal line and +12V signal line.

6. The EV charger of claim 5, wherein the EV circuit breaker charger communicates with the EV via the control pilot signal line at least one of that the EV circuit breaker charger is a right charger for the EV or what a right charge current for the EV is.

7. The EV charger of claim 1, wherein the charging space comprises a parking spot for the EV.

8. The EV charger of claim 1, wherein the panelboard is structured to receive a plurality of EV circuit breaker chargers each couplable to one disconnect switch box.

9. The EV charger of claim 1, wherein the disconnect switch box further comprises a user interface arranged on a front cover of the disconnect switch box.

10. The EV charger of claim 9, wherein the user interface comprises a display structured to indicate at least charging status of the EV circuit breaker charger.

11. The EV charger of claim 10, wherein the charging status comprises an indication that the EV circuit breaker charger is charging, idle, or in a fault.

12. The EV charger of claim 9, wherein the user interface comprises a plurality of light emitting diodes structured to indicate at least charging status of the EV circuit breaker charger.

13. The EV charger of claim 1, wherein the disconnect switch box further comprises an alert mechanism structured to alert an event of fault.

14. The EV charger of claim 13, wherein the alert mechanism is structured to provide an audible alert.

15. The EV charger of claim 1, wherein the disconnect switch box further comprises a holder arranged externally on a housing of the disconnect switch box.

16. The EV charger of claim 1, wherein the EV charging cord has a length of less than or equal to 7.62 meters.

17. The EV charger of claim 1, wherein the EV connector comprises a plurality of light emitting diodes structured to indicate charging status of the EV circuit breaker charger.

18. The EV charger of claim 1, wherein the charging space comprises at least one of an indoor charging space or an outdoor charging space.

19. The EV charger of claim 1, wherein the EV circuit breaker charger is an EV smart circuit breaker charger remotely controllable by a user via a wireless connection.

20. A disconnect switch assembly for use in charging an electric vehicle (EV) comprising:
   an EV connector structured to be inserted into a power receptacle for an EV;
   an EV charging cord coupled to the EV connector; and
   a disconnect switch box structured to be installed at a charging space for the EV and including a disconnect switch structured to connect or disconnect power supply to the EV and a terminal block structured to connect communications lines, wherein the disconnect switch box is couplable to an EV circuit breaker charger via a separate EV charging cord and the EV circuit breaker charger is structured to be inserted within a panelboard remotely located from the charging space, provide a circuit protection in an event of fault, supply power for EV charging to the EV via power lines, and communicate with the EV via the communications lines.

* * * * *